July 14, 1970 K. G. LEIB ET AL 3,520,592
OPTICAL FOCUSING SYSTEM UTILIZING BIREFRINGENT LENSES
Filed Sept. 14, 1967 4 Sheets-Sheet 1

INVENTORS
KENNETH G. LEIB
RICHARD S. ENG
BY
ATTORNEY

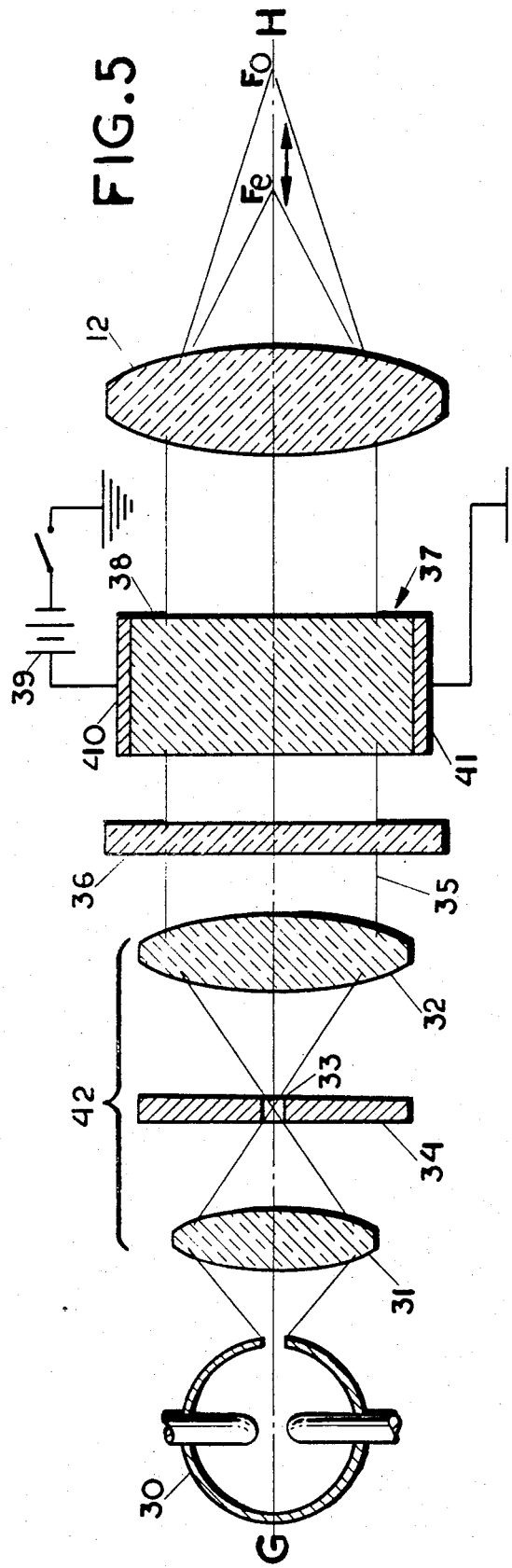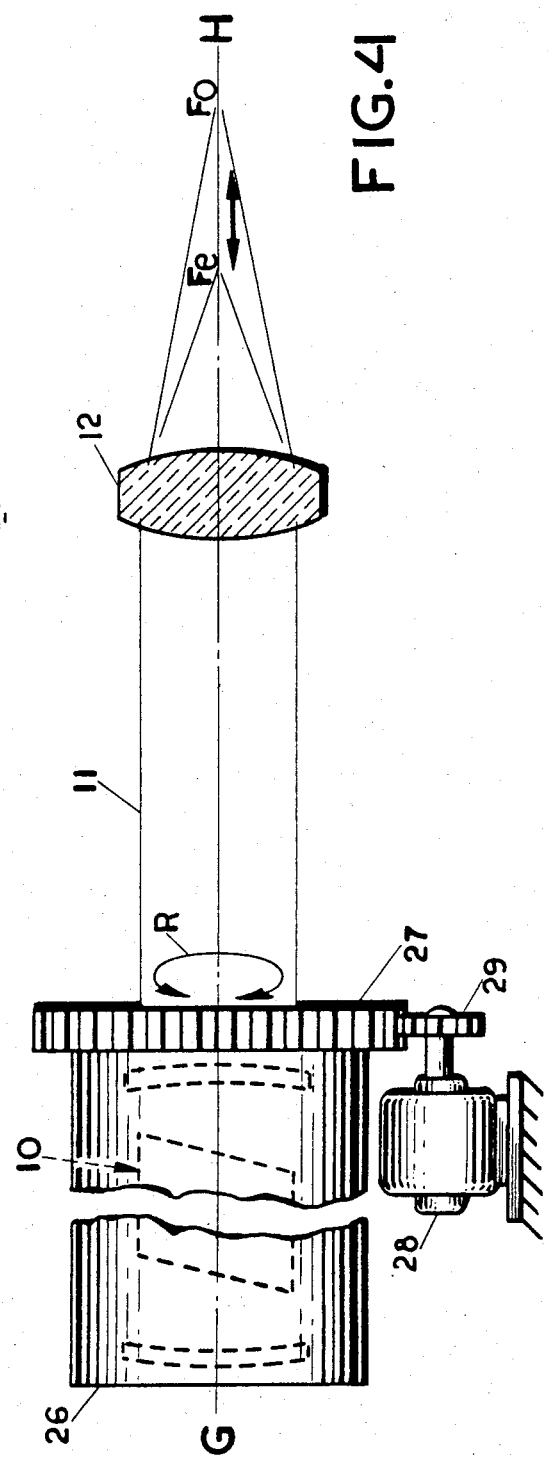

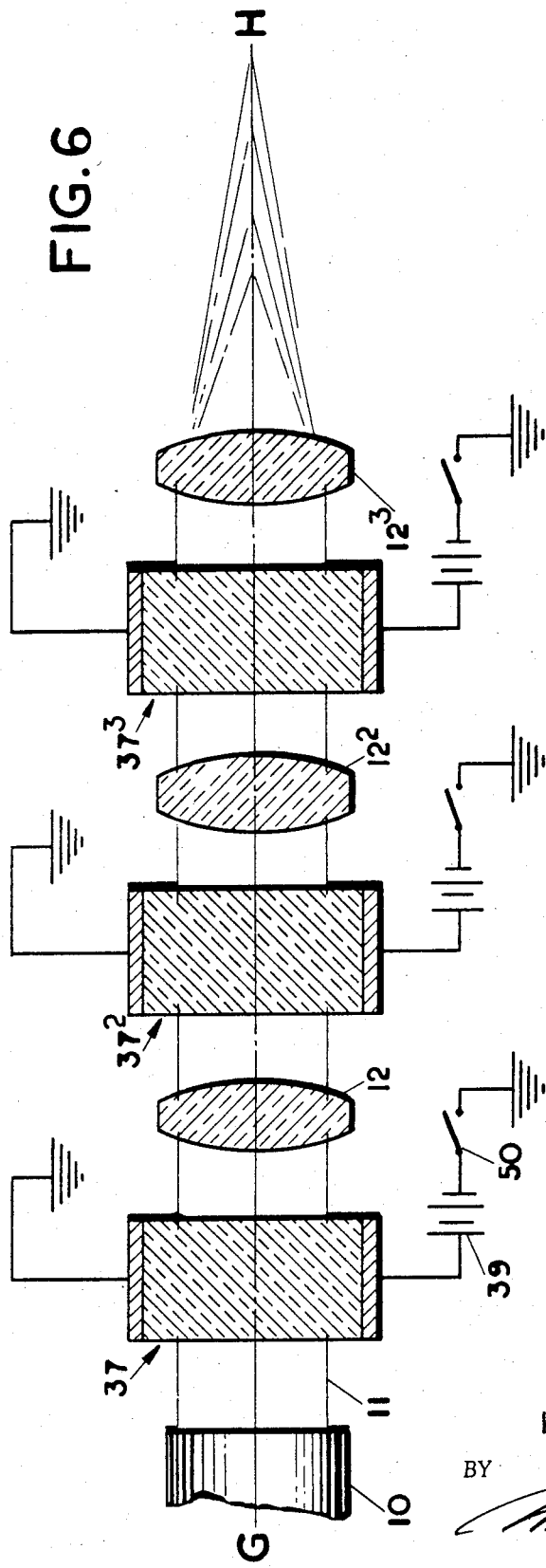

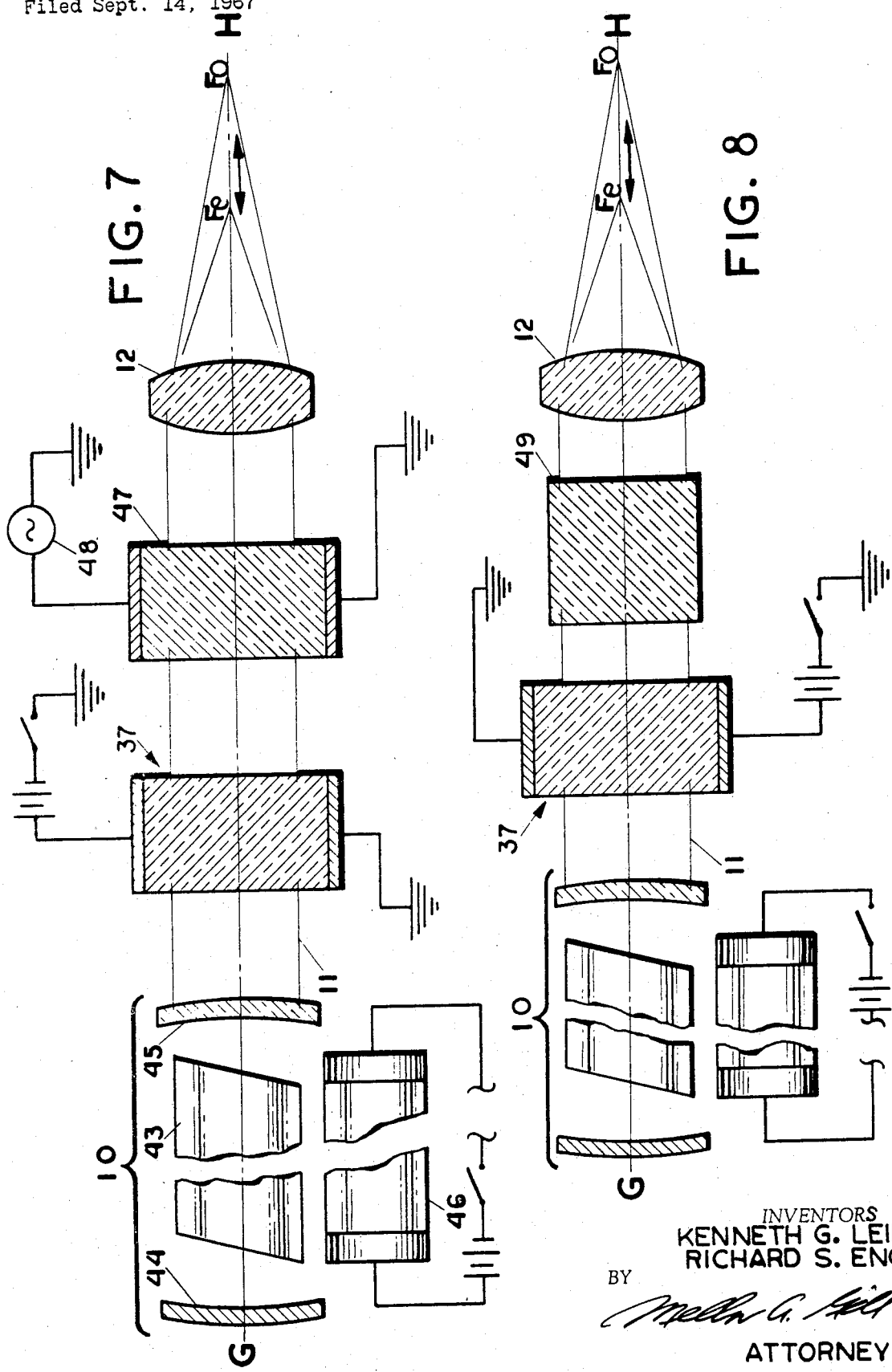

United States Patent Office 3,520,592
Patented July 14, 1970

---

3,520,592
OPTICAL FOCUSING SYSTEM UTILIZING BIREFRINGENT LENSES
Kenneth G. Leib, Wantagh, and Richard S. Eng, Old Bethpage, N.Y., assignors to Grumman Corporation, a corporation of New York
Filed Sept. 14, 1967, Ser. No. 667,848
Int. Cl. G02f 1/26
U.S. Cl. 350—150                        16 Claims

---

ABSTRACT OF THE DISCLOSURE

This invention is an optical system which uses polarized light in conjunction with a birefringent lens such that the focus of the system can be changed simply by a relative rotation of the plane of polarization of the light with respect to the optic axis of the birefringent lens. The relative rotation of the plane of polarization of the light with respect to the birefringent lens may be obtained by a rotation of the light source, if that source is a generator of plane-polarized light, or by rotation of the light polarization state by the polarization control means used in conjunction with the light source and the birefringent lens, or by rotation of the birefringent lens itself. Control of the polarization state may be accomplished by mechanical means or electronically by means such as an electro-optic cell. An increase in the number of focal points of the system can be obtained readily by incorporating additional lens and polarization control means. This invention can be utilized advantageously in laser-type welders and in an optical harmonic separator.

---

This invention relates to an improvement in optical focusing systems and, in particular, to an optical system in which the focus is controlled by the relative rotation of the light beam polarization with respect to the optic axis of a birefringent lens.

When it is desired to vary the focal point in conventional lens systems, the adjustment is accomplished normally in one of two ways: an adjustment can be made either in the axial spacing of the conventionally used isotropic lens, or a change can be made by mechanical means to a lens of different focal length. Because the switching time and repetition rate are poor, and because the accuracy of the system may be compromised when mechanical lens changes are made, focal adjustments in conventional optical systems are generally made by a change of the axial spacing of the lens. The necessity for an axial adjustment in any mechanism does, of course, introduce complexities in mechanical design to avoid possible degradation in system accuracy. From a mechanical design standpoint, a rotational adjustment about a fixed axis is to be preferred over an axial adjustment along that same axis.

It is the principal object of our invention to provide an improved optical system whose focus may be changed readily by a simple rotation of one of the system elements.

It is another object of our invention to provide improved means for changing the focus in optical systems in which such focal change may be made by a simple rotational movement rather than by the conventional axial focus adjustment with its inherently greater mechanical complexity.

Yet another object of our invention is the provision of an improved optical system in which advantage is taken of the multiple indices of refraction of a birefringent lens used with polarized light such that rotation of either the lens or of the light's plane of polarization will result in a change of focus of the system.

A further object of our invention is to provide an improved optical system operating under the principles broadly set forth in our objective stated above in which an electro-optic cell is incorporated in the system to rotate selectively the plane of polarization of the light such that the focal length of the optical system may be changed by purely electronic means.

Still another object of our invention is to provide an improved optical system whose focal length may be changed by purely electronic means so that advantage may be taken not only of the ultra-high operating speeds attainable with electronic means, but also of the relatively high level of reliability inherent in electronic systems at such ultra-high operating speeds due to the absence of moving mechanical parts.

Another object of our invention is to provide an improved optical system in which a greater number of focal points than two may be obtained without adding unduly to the complexity of the system and in which a switch may be made relatively to any one of those focal points using purely electronic means.

It is yet another object of our invention to provide an improved optical system in which advantage is taken of the multiple indices of refraction of a birefringent lens with respect to the change in polarization of the harmonic frequencies relative to the fundamental frequency of a light beam such that those changes in polarization may be used in conjunction with a birefringent lens to obtain an uncomplicated, electronically controlled or passive harmonic separator.

Other objects and advantages will become apparent from the following description when taken in conjunction with the accompanying drawings in which:

FIG. 4 is a diagrammatic representation, partially in section, of an embodiment of our invention in which the source of polarized light is rotated to control the focal length of the system;

FIG. 5 is a digrammatic representation, partially in section, of our invention embodying an electro-optic cell to control the polarization state of the light beam;

FIG. 6 is a diagrammatic representation, partially in section, of our invention embodying a plurality of electro-optic cells to control the polarization state of the input light of a plurality of birefringent lenses to thus increase the number of focal points of the optical system;

FIG. 7 is a diagrammatic representation, partially in section, of our invention embodied in a laser apparatus useable for welding operations; and FIG. 8 is a diagrammatic representation, partially in section, of our invention embodied in an optical harmonic separator.

In order to facilitate the explanation of our invention, the reference to light and lenses will be understood to refer to visible light and to lenses of a transparent material. It will be appreciated that this is merely a matter of convenience and the same explanation would apply substantially with equal validity to electromagnetic radiation of frequencies other than the visible, and to lenses constructed of a material suitable to the band of the electromagnetic spectrum utilized. Thus, while the lens will be transparent to the frequency band used, it may not be transparent in the sense that one can "look" or "see" through it.

Although the optical terms employed herein are used in the manner commonly employed in the art, it may be helpful in the following explanation of our invention if we begin by broadly defining some of these terms. We, thus, as is usual, define a lens as a transparent piece of material shaped to converge or diverge a beam of light. A beam is taken to mean a set of parallel rays of radiation. Convergence of the beam means that the rays are refracted so that they pass through a single point, F, called the focus of the lens. Divergence means that the rays are refracted so they spread out as they would if they had originated at a point—also called the virtual focus, F. The distance from the center of the lens to F is called the focal length, $f$. A lens' focal length is dependent upon the index of refraction of the lens material and the radii of curvature of the lens. Ordinarily glass lenses are fabricated from a homogeneous material of an isotropic nature and such lenses have a single specific index of refraction and consequently, a single focal length. On the other hand, homogeneous anisotropic or birefringent crystal materials have two and sometimes three indices of refraction. Our invention is based on the discovery that if the light incident upon such birefringent lens is polarized, the polarized ray will respond to various indices depending upon the angle at which the ray is incident with respect to the surfaces and the optic axes, and upon the particular type of crystal. It follows, therefore, that if the ray responds to different indices of refraction, a variable quantity is introduced that allows a lens with fixed radii of curvature to have a multiple focal length. In our invention, the plane of polarization of the polarized ray is rotated selectively relative to the crystal axes so that different indices of refraction are "seen" such that the rotation of the plane of polarization results in a change in the focal length of the lens. It is obvious, of course, that this relative rotation may be obtained by either rotating the birefringent lens itself, or by rotating the plane of polarization of the incident beam.

Figure 1:
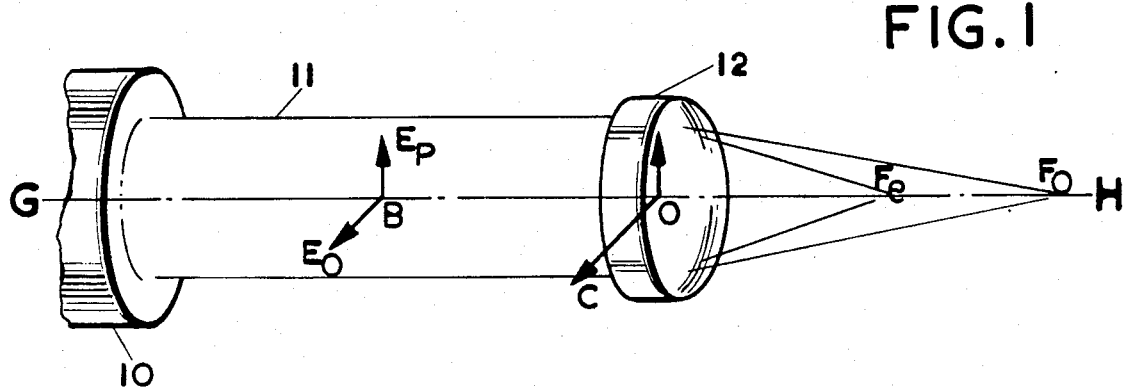
FIG. 1 is a diagrammatic representation of our invention showing the variable focal length of a birefringent lens with respect to certain optical properties of a polarized light beam and the birefringent lens.

Referring first to FIG. 1 for a simplified description of what we believe to be the operating principle of our invention, a light source 10 of any suitable type such as a laser is used to produce a beam 11 of collimated, plane-polarized light. It will be obvious, of course, if the output of such source is not collimated that the collimation of the beam may be accomplished by ordinary lenses (not shown) or by other well known means. Beam 11 is brought to a focus by birefringent lens means 12. The lens means 12, which may be of an equiconvex or plano-convex type lens fabricated from a material such as calcite or crystal quartz, has its crystalline optic axis OC selected such that it is parallel to the plane of the lens and perpendicular to the axis of symmetry of the lens. If beam 11 is polarized $BE_p$ perpendicular to the optic axis OC of lens 12, the beam will be focused by the lens at a focal point $F_e$. (As is customary in illustrating optical phenomena, only the outer rays of the light beam will be shown in the drawings.) If beam 11 is polarized $BE_o$ parallel to the optic axis OC of lens 12, the beam will be focused by the lens at a focal point $F_o$. As was stated above, it is believed that this change of focus with change of polarization state is due to the fact that in each of the polarization states the components will respond to a different but constant index of refraction will, therefore, be imaged at different points along the lens axis GH. Thus, through polarization control or, conversely, through rotation of the lens about its axis of symmetry GH, the focus of a polarized beam can be switched from one point ($F_e$) on axis GH to another ($F_o$) so that the energy distribution of the beam can be varied at will between those points.

Figure 2:
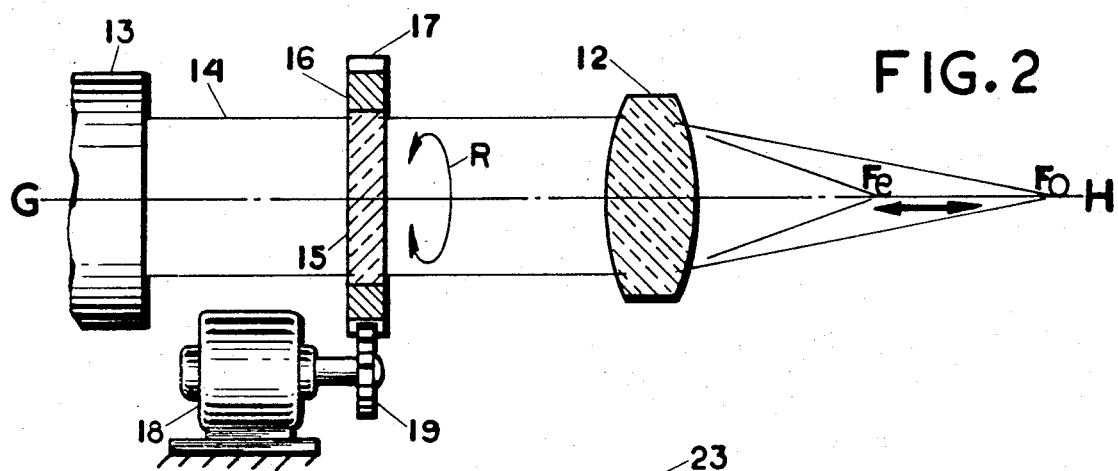
FIG. 2 is a diagrammatic representation, partially in section, of an embodiment of our invention in which the polarizing means is rotated to control the focal length of the optical system.
Figure 3:
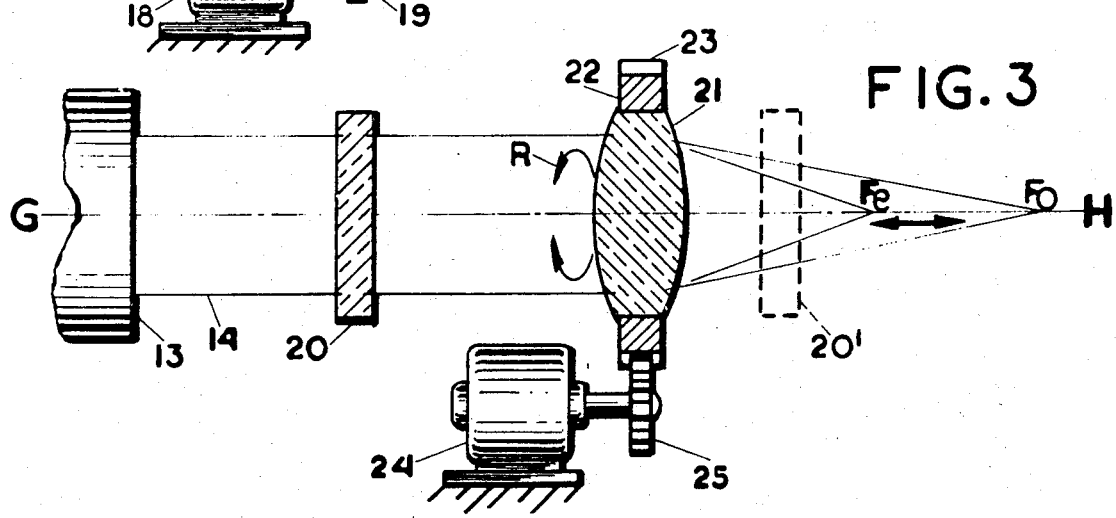
FIG. 3 is a diagrammatic representation, partially in section, of an embodiment of our invention in which the birefringent lens is rotated to control the focal length of the optical system.

FIGS. 2, 3, and 4 illustrate embodiments of our invention showing three means for obtaining the relative rotation of the optical elements which produce a change in focal length of the system. In FIG. 2, 13 is a light source producing a collimated beam of unpolarized light 14 which is passed through a suitable polarizing means such as sheet polarizer 15. Polarizer 15 is mounted for rotation about axis GH using any suitable means such as, for example, housing 16 whose periphery is provided with a ring gear 17 adapted to be driven by a motor 18 by means of a pinion 19. After passing through polarizer 15, the light beam 14 is focused by a birefringent lens 12 on some point along the optical axis GH of the system. In the operation of this embodiment, motor 18 is actuated by a suitable control circuit (not shown) to rotate polarizer 15 as indicated by directional arrow R to thus shift controllably the focal length of fixed lens 12.

FIG. 3 illustrates a second means for obtaining the relative rotation of the optical elements to accomplish the objective of our invention. A light source 13 produces a collimated beam of unpolarized light 14 which is passed through a suitable polarizing means such as sheet polarizer 20. After passing through polarizer 20, the light beam 14 is focused by a birefringent lens 21 on some point along optical axis GH. Lens 21 is mounted for rotation about axis GH using any suitable means such as, for example, housing 22 whose periphery is provided with a ring gear 23 adapted to be driven by a motor 24 by means of a pinion 25. In the operation of this embodiment, motor 24 is actuated by a suitable control circuit (not shown) to rotate lens 21 as indicated by directional arrow R to thus shift controllably the focal length of the lens 21.

It will be appreciated that the relative rotation of the plane of polarization of the light beam with respect to the birefringent lens also may be attained if the beam-polarizing means is positioned on the opposite or "output" side of the birefringent lens. Thus, although there is some loss of efficiency, the system functions effectively, for instance, in the embodiment illustrated in FIG. 3, when the beam-polarizing means is located with respect to lens 21 in the position indicated by sheet polarizer 20' shown in broken lines. This alternate position for the polarizing means may be employed where applicable in other embodiments of our invention including that illustrated in FIG. 2. In that embodiment, the system operates effectively when the polarization control means (15 through 19 inclusive) are located on the opposite or "output" side of birefringent lens 12.

Although we have shown a filter being used in conjunction with the light source, the fidelity of focus with non-laser light sources can be increased if a filter is used to restrict the light to a single "color."

A third means for practicing our invention is illustrated in FIG. 4. In this embodiment, the light source 10 is of a type such as a laser that produces a well-collimated, plane-polarized beam of light 11. This light beam is focused by a birefringent lens 12 on some point along the optical axis GH of the system. Laser 10 is mounted for rotation about axis GH using any suitable means such as, for example, housing 26 which is provided on one end with a ring gear 27 adapted to be driven by a motor 28 by means of a pinion 29. In the operation of this embodiment, motor 28 is actuated by a suitable control circuit (not shown) to rotate the polarized light source 10 as indicated by directional arrow R to thus shift controllably the focal length of fixed lens 12.

It will be understood, of course, that the means shown to effectuate the relative rotation of the elements of the optical systems in the three embodiments described above are merely representative examples only of means suitable for the purpose and are not to be construed to impose any limitation on the mechanisms that can be used within the meaning and scope of our invention. Also in the interest of clarity and because the mechanisms shown are merely illustrative examples, it is believed that it would serve no useful purpose to show associated equipment such as electrical circuitry, power sources, and the like, that would be required for the operation of the examples shown.

Refer to FIG. 5 for a preferred embodiment of our invention in which the incorporation of an electro-optic cell in the optical system makes it possible to switch electronically the focal length of the lens. In the preferred embodiment shown in FIG. 5, 30 is a high-intensity spectral source such as a high-pressure mercury lamp. This lamp can be a source of visible light or, if desired, a source of invisible light in other frequency ranges of the electromagnetic spectrum, such as the ultra-violet. Collimating lenses 31 and 32, with the aid of a properly spaced aperture 33 in diaphragm 34, bring the point source of light 30 to a parallel beam 35. This beam 35 is then linearly polarized by suitable polarizing means 36, which may be simply a sheet polarizer. If preferred, other means well known in the art, such as a dichroic polarizer, can be utilized. The orientation of the linearly polarized light waves in beam 35 may be adjusted to "set up" the system by rotating polarizing means 36 in a well understood manner about an axis GH coaxial to the beam direction. Linearly polarized beam 35 is then passed through an electro-optic cell 37 which may be fabricated from a uniaxial lithium niobate crystal 38 having a high electro-optic coefficient. The operation of such cell 37 is based on the electro-optic property of such uniaxial crystals that the index of refraction is a function of the applied electric field in a given direction. A battery 39 or a high-frequency generator applies the required electric field on cell 37 by means of a pair of shell-metal electrodes 40 and 41. After passing through cell 37, the beam 35 is focused by a birefringent lens 12 on some point F along axis GH.

In operation of the preferred embodiment shown in FIG. 5, light from point source 30, having passed through collimating lens system 42, comprising collimating lenses 31 and 32 and aperture 33 of diaphragm 34, emerges as a beam of light 35 having para-axial rays. This beam passes through polarizer 36 such that the input into electro-optic cell 37 is linearly polarized. Alignment of the optic axis of crystal 38 of cell 37 is in the plane of the drawing and perpendicular to the beam axis GH. The effective length of cell 37 is chosen such that, with no electric field on the cell, an incident beam polarized at 45 degrees clockwise with respect to the optical axis (viewed in the same direction as the beam) will produce an output beam still linearly polarized in the same direction. As is known, the addition of a ¼-wave plate (not shown) in the system will permit greater latitude in providing the correct effective length of cell 37. Because the electric vector can be resolved into components along the optic axis and an axis at 90 degrees from the optic axis, the phase delays are thus such that the phase of the extraordinary wave is a multiple of 360 degrees from that of the ordinary wave. By applying an electric field of a proper value as is well known with such electro-optic cells, the phase of the extraordinary wave can be made to differ from the ordinary wave by an odd multiple of 180 degrees and the electric vector at the output end of cell 37 will be rotated 90 degrees from the direction of the original input vector. The output beam from cell 37 is then passed through birefringent lens 12 whose optic axis is at 45 degrees to the optic axis of cell 37. Wen the electric field of predetermined value is applied to the cell 37, the incident beam responds to the ordinary index of refraction and the lens 12 will thus focus the beam at $F_o$. With no voltage applied to cell 37, the incident beam responds to the extraordinary index of refraction and will thus be focused by lens 12 at point $F_e$. Because the crystal is uniaxially positive, $F_o$ is further from the lens than $F_e$.

Unlike a purely mechanical device, the electro-optic cell 37 is extremely rapid in its response and it is feasible to vary the applied field at a megacycle-per-second rate. An electric field transverse to the light beam axis is utilized with the lithium niobate crystal cells in our preferred embodiment. This type of modulation is known as transverse modulation. Cells fabricated from other uniaxial crystals such as potassium dihydrogen phosphate (KDP) and ammonium dihydrogen phosphate (ADP) are controlled by an electric field applied parallel to the light beam axis in what is known as longitudinal modulation.

Inasmuch as the operating principle of our invention is based on the response of polarized light with respect to the indices of refraction of a birefringent lens and as the crystalline lens materials most suitable for our purposes usually have two well-defined indices of refraction, it will be understood that, because the above-described embodiments of our invention have only a single birefringent lens, such embodiments, thus, will have only two well-defined focal points. There will be, of course, a distribution of energy on either side and between the two focal points depending on the plane of polarization of the light beam with respect to the lens' indices of refraction, but there will be only two sharp focal points or points of maximum energy. The attainment of a greater number of focal points, however, is readily achievable by incorporating more lenses (and associated polarization control means).

An embodiment of our invention having a plurality of birefringent lenses is illustrated in FIG. 6. In this embodiment, a light source 10 of any suitable type such as a laser is used to produce a beam 11 of collimated, plane-polarized light. Polarized beam 11 is passed through an electro-optic cell 37. As stated in our description of the previously-mentioned embodiment, the index of refraction of cell 37, and consequently the polarization state of its output beam, is a function of the applied electric field in a given direction. A battery 39, or a high-frequency generator, controlled by suitable switching means 50, applies the required electric field on cell 37. After leaving cell 37, the light beam 11 passes through a birefringent lens 12. As is apparent, the apparatus of FIG. 6 as described to this point is essentially a two-focal point system substantially similar to our previously described embodiments. To obtain a greater number of focal points, the output of lens 12 is passed through a further series of cell ($37^2$ and $37^3$) and lens ($12^2$ and $12^3$) sets. In FIG. 6, of course, after passing through the three cell and lens sets, beam 11 is brought to a focus on some point along axis GH. Because of the variables introduced by various factors such as lens material and lens geometry, any attempt to illustrate either the spacing or position of the ultimate focal points of the system would have little meaning and thus such points are not shown in FIG. 6.

In operation in the embodiment shown in FIG. 6, the beam 11 of collimated, plane-polarized light from source 10 is passed through electro-optic cell 37. Cell 37 is aligned such that the plane of polarization of the input beam is located at an angle of 45 degrees to the optic axis of the cell when there is no field on the cell. Lens 12, in turn, is aligned such that the plane of polarization of its input beam from cell 37 is located either parallel or perpendicular to the optic axis of the lens. This required angular relationship between the plane of polarization of the input beam with respect to the optic axis of the cells and lenses applies in each of the cells (37, $37^2$, and $37^3$) and lenses (12, $12^2$, and $12^3$) of the optical train. After leaving cell 37, the light beam 11 is focused by birefringent lens 12. As described previously, two well-defined focal points can be obtained and those focal points of lens 12 will depend upon the lens material, the lens geometry, and the state of polarization of the light beam. The state of polarization of the light beam, in turn, depends upon the field applied on cell 37. Output beam from lens 12 passes through electro-optic cell $37^2$ where the polarization state may be left in the state is was received or, by the application of an electric field on the cell, the output state may be switched by an angle of 90 degrees. Beam 11 is then operated on in turn in a similar manner by birefringent lens $12^2$, cell $37^3$, and birefringent lens $12^3$ and is brought to a focus at a point somewhere along axis GH. The location of the beam's ultimate focal point will be established by the character of the birefringent lenses and the polarization states of the beam determined by the electro-optic cells. The ultimate focal point is established according to the thin lens formula if the overall length of the lens system still validates it as an equivalent thin lens. The system then will have the focal length given by:

$$\frac{1}{f_{\text{resultant}}} = \frac{1}{f_{1_o^e}} + \frac{1}{f_{2_o^e}} + \frac{1}{f_{3_o^e}}$$

where $$f_{n_o^e}$$

are the focal points for each lens for the extraordinary ($e$) and ordinary ($o$) waves. Since each lens generally has two states, a total of:

$$F_{\text{max}} = 2n$$

focal points can be obtained where F is the number of focal points and $n$ is the number of lenses of different focal lengths. For lenses having identical focal lengths, this number is reduced depending upon the degree of redundancy, but never to a value less than:

$$F_{\text{min}} = n + 1$$

focal points.

If the overall length of the lens system does not qualify it as an equivalent thin lens, the imaging properties can be calculated according to the rules used normally for combination of lenses not in contact. In any event, because the focal length is still governed by the polarization state of the light beam, multiple focal points are still achievable.

In the preferred embodiment of our invention shown in FIG. 5, the point source of light 30 may, of course, be a laser. Lasers are coming into increasingly common usage so it is not felt necessary to describe such means in detail. A laser beam is highly coherent and it can be focused to a much smaller spot than ordinary incoherent light: it can, in fact, be focused down to a size approaching theoretical limits. This high-energy flux of the laser gives it special advantages in the art of welding. In using the laser for welding, accuracy in controlling the beam size or focal length is a requisite because the strength of the weld depends on the operating conditions of the laser beam. The precise control of focusing possible with our invention, thus, gives it special advantages when used in laser welding apparatus. An embodiment of our invention in a laser welder is shown schematically in FIG. 7 in which 10 is a laser. Laser 10 may be of the conventional type with a ruby or a neodymium-doped optical crystal 43 which is caused to "lase" by a pair of cavity mirrors 44 and 45 under the influence of an intense light-pumping source 46. Although the output beam 11 of the laser 10 is linearly polarized and has negligible divergence, it may, if desired, be passed through a collimating lens system such as system 42 depicted in FIG. 5. As is also described in that embodiment, plane-polarized, collimated beam 11 is passed through an electro-optic cell 37. Beam 11 is then modulated further, if required, by an intensity modulator 47 before being focused by the birefringent lens 12 to a focal point along optical axis GH determined as explained previously by the electrical field on cell 37. Thus, electro-optic cell 37 provides control of the focus to regulate the depth of the weld and an intensity modulator 47 provides attenuation control to give the welding operator additional control in laser welding operations. In its simplest form, the intensity modulator 47 may be a polarizing sheet (not shown) rotated about the optical axis by suitable means to attenuate the plane-polarized beam 11 to the desired degree. Intensity modulator 47 may also be an electro-optic cell as is shown in which a source 48 of variable voltage is used to rotate the plane of polarization of the cell to vary the degree of attenuation of the plane-polarized laser beam 11 as required.

A still further embodiment serving to illustrate the utility of our invention is the harmonic separator shown schematically in FIG. 8. In this embodiment, the output beam 11 of laser 10 is passed through electro-optic cell 37 and is incident on a harmonic generator 49. Harmonic generator 49 is of a type that generates a second or higher harmonic of the fundamental frequency of the laser beam. For second harmonic generation, crystalline materials such as KDP, ADP, lithium niobate, and the like, are suitable for use in the generator. After passing through the harmonic generator 49, the laser beam 11 is focused by birefringent lens 12 on a point along optical axis GH.

In the operation of the harmonic separator illustrated in FIG. 8, laser 10 produces an output beam 11 of a fundamental frequency which has negligible divergence and which is linearly polarized. This output beam is then passed through electro-optic cell 37 such that plane of polarization of the beam relative to the optical axis of the cell 37 is a function of the electric field applied to the cell. As explained previously, the application of an electric field of the proper value on the cell 37 causes the phase of the extraordinary wave to differ from the ordinary wave by an odd multiple of 180 degrees and the output electric vector from the cell 37 will be rotated 90 degrees from the direction of the original input vector. Since only by sending the beam such that the electric vector of the fundamental frequency is 90 degrees to the optical axis of the crystal of the harmonic generator 49 can proper phase matching result, the application of an electric field to cell 37 results in an output beam of the fundamental frequency from harmonic generator 49 and that beam will be focused at a point $F_e$ along optical axis GH. It follows, therefore, that if there is no electric field applied applied to cell 37, the output beam from the harmonic generator will be composed of the second or harmonic frequency as well as the fundamental frequency and those two components will be focused at different points along optical axis GH, the fundamental frequency again being focused at $F_e$ and the harmonic frequency at $F_o$. Because of the physical properties of the crystalline material of the harmonic generator 49, the plane of polarization of the output beam of the fundamental frequency is perpendicular to the plane of polarization of the second harmonic frequency. (For harmonic generators using a lithium niobate crystal, the plane of polarization of an output beam of the fundamental frequency is perpendicular to the optic axis of the crystal and the second harmonic generated is polarized parallel to the optic axis.) This paraaxial beam from the harmonic generator 49 is then passed through birefringent lens 12 which focuses the beam along optical axis GH at focal points $F_o$ or $F_o$ depending on the orientation of the plane of polarization of the beam with respect to the optic axis of the birefringent lens. Thus, in the embodiment described above, if the fundamental and second harmonic orientations of the beam are rotated by 90 degrees at the input side of the birefringent lens, the focal points $F_e$ and $F_o$ will be interchanged.

Although shown and described in what is believed to be the most practical and preferred embodiments, it is apparent that departures from the specific constructions shown will suggest themselves to those skilled in the art and may be made without departing from the spirit and scope of the invention. We, therefore, do not wish to restrict ourselves to the particular constructions illustrated and described, but desire to avail ourselves of all modifications that may fall within the scope of the appended claims.

Having thus described our invention, what we claim is:

1. An optical system comprising a source of plane-polarized light, birefringent lens means for focusing light polarized in a first plane of polarization perpendicular to the axis of said lens at a first optic focal point and light polarized in a second plane of polarization perpendicular to said first plane of polarization at a second focal point, said source of plane-polarized light being incident on said lens means, and means for providing relative rotation about the optical axis of said system of the plane of polarization of said light and said lens means respectively to orient the plane of polarization to any angle between said first plane of polarization and said second plane of polarization to thereby adjust the ratio of energy focused at said first focal point to the energy focused at said second focal point.

2. An optical system as set forth in claim 1 in which said respective relative rotation of the plane of polarization of said light and said lens means is continuous.

3. An optical system as set forth in claim 1 wherein said source of plane-polarized light comprises a source of light, and polarizing means.

4. An optical system as set forth in claim 3 in which the respective relative rotation of the plane of polarization of the polarized light and said lens means is continuous.

5. An optical system as set forth in claim 3 wherein said source of plane-polarized light comprises a source producing a beam of collimated light.

6. An optical system as set forth in claim 5 in which the respective relative rotation of the plane of polarization of the polarized light and said lens means is continuous.

7. An optical system as set forth in claim 1 wherein said means providing respective relative rotation of the plane of polarization of said light comprises an electro-optic cell, and means for applying selectively an electric field on said cell such that the pane of polarization of the said polarized light passing through said cell is rotated about the optical axis of said system and relative to said lens means.

8. An optical system as set forth in claim 7 wherein said light source produoes a beam of collimated, plane-polarized light.

9. An optical system as set forth in claim 3 wherein said means providing respective relative rotation of the plane of polarization of said light comprises an electro-optic cell, and means for applying selectively an electric field on said cell such that the plane of polarization of said polarized light passing through said cell is rotated about the optical axis of said system and relative to said lens means.

10. An optical system as set forth in claim 1 wherein the birefringent lens means comprise at least two birefringent lenses, and including means associated with each of said lenses for providing selectively for selectively rotation about the optical axis of said system of the plane of polarization of said light and each of said lenses respectively such that the relative rotation varies the focal length of each of said lenses by changing its effective index of refraction with respect to said light whereby the ultimate focal length of said system may be varied, each of said lenses having dissimilar effective indices of refraction with respect to any other lens.

11. An optical system as set forth in claim 10 in which at least one of said polarization control means providing for the relative rotation of the plane of polarization of said light is an electro-optic cell, and means for selectively applying an electric field on said cell to produce thereby said relative rotation.

12. A welding apparatus comprising a laser, a birefringent lens, a first polarizing means interposed between said laser and said lens for polarizing the light beam from said laser and for rotating the plane of polarization of said light beam relative to said lens to focus said light beam at a selected focal point, second polarizing means interposed between said first polarizing means and said lens, and means for rotating selectively the plane of polarization of said second polarizing means whereby a controlled attenuation of the light beam focused at said point is provided.

13. A welding apparatus as set forth in claim 12 in which at least one of said means providing for the relative rotation of the plane of polarization of said light beam is an electro-optic cell, and means for selectively applying an electric field on said cell to thereby produce said relative rotation.

14. A harmonic frequency separator comprising an energy source producing a polarized light beam of fundamental frequency, a harmonic generator responsive to polarized light input for producing a light output of the same frequency as the light input in one polarization plane and a harmonic frequency light output in an orthogonal plane as a function of the orientation of the polarized input, a birefringent lens, said light beam passing successively through said generator and said lens, whereby the fundamental and harmonic frequencies of said harmonic generator output are focused at different points along the optical axis.

15. An optical system comprising a source of light, birefringent lens means having a plurality of focal points, polarizing means for polarizing a light beam and means for providing relative rotation about the optical axis between said lens means and said polarizing means, said birefringent lens means being interposed between said source of light and said polarizing means whereby the output from said lens means is transmitted through said polarizing means and the energy distribution from said source between said focal points is selected by the orientation of the plane of polarization of said polarizing means.

16. A system as set forth in claim 15 wherein said means for providing relative rotation provides for continuous relative rotation between said lens means and said polarizing means.

References Cited

UNITED STATES PATENTS 3,388,314 6/1968 Gould _____ 331—94.5
3,410,624 11/1968 Schmidt _____ 350—175

FOREIGN PATENTS 231,848 Great Britain.

DAVID SCHONBERG, Primary Examiner

P. R. MILLER, Assistant Examiner

U.S. Cl. X.R.
350—157, 159, 175

UNITED STATES PATENT OFFICE
CERTIFICATE OF CORRECTION

Patent No. 3,520,592            Dated July 14, 1970

Inventor(s) K. G. Leib et al

It is certified that error appears in the above-identified patent and that said Letters Patent are hereby corrected as shown below:

Column 3, line 18, for "Ordinarily" read -- Ordinary --; line 66, for "refraction will" read -- refraction and will --. Column 4, line 48, for "have shown" read -- have not shown --. Column 5, line 64, for "Wen" read -- When --. Column 8, line 39, cancel "applied"; line 57, for "$F_o$" (first occurrence) read -- $F_e$ --. Column 9, line 3, for "the axis" read -- the optic axis --; line 3, for "first optic focal" read -- first focal --; line 51, for "selectively" (second occurrence) read -- relative --.

SIGNED AND
SEALED
OCT 27 1970

(SEAL)
Attest:

Edward M. Fletcher, Jr.
Attesting Officer

WILLIAM E. SCHUYLER, JR.
Commissioner of Patents